US011910123B2

United States Patent
Fluegel

(10) Patent No.: US 11,910,123 B2
(45) Date of Patent: Feb. 20, 2024

(54) SYSTEM FOR PROCESSING IMAGE DATA FOR DISPLAY USING BACKWARD PROJECTION

(71) Applicant: MAGNA ELECTRONICS INC., Auburn Hills, MI (US)

(72) Inventor: Sebastian Fluegel, Ottobrunn (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 17/815,307

(22) Filed: Jul. 27, 2022

(65) Prior Publication Data

US 2022/0368839 A1 Nov. 17, 2022

Related U.S. Application Data

(63) Continuation of application No. 16/252,871, filed on Jan. 21, 2019, now abandoned, which is a continuation of application No. 15/334,365, filed on Oct. 26, 2016, now Pat. No. 10,187,590.

(60) Provisional application No. 62/246,870, filed on Oct. 27, 2015.

(51) Int. Cl.
| | |
|---|---|
| *H04N 5/265* | (2006.01) |
| *H04N 7/18* | (2006.01) |
| *H04N 9/31* | (2006.01) |
| *H04N 23/63* | (2023.01) |
| *H04N 23/90* | (2023.01) |
| *H04N 23/698* | (2023.01) |

(52) U.S. Cl.
CPC ............ *H04N 5/265* (2013.01); *H04N 7/181* (2013.01); *H04N 9/3185* (2013.01); *H04N 23/63* (2023.01); *H04N 23/698* (2023.01); *H04N 23/90* (2023.01)

(58) Field of Classification Search
CPC ...... H04N 5/265; H04N 7/181; H04N 9/3185; H04N 23/63; H04N 23/698; H04N 23/90
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,020,704 | A | 2/2000 | Buschur |
| 6,049,171 | A | 4/2000 | Stam et al. |
| 6,052,124 | A | 4/2000 | Stein et al. |
| 6,066,933 | A | 5/2000 | Ponziana |

(Continued)

*Primary Examiner* — Richard T Torrente
(74) *Attorney, Agent, or Firm* — HONIGMAN LLP

(57) ABSTRACT

A vehicular vision system includes a first camera and a second camera. The system includes an electronic control unit (ECU) and a video display operable to display video images derived from frames of first image data captured by the first camera and frames of second image data captured by the second camera. Responsive to a view selection input selecting a view for the video display, the system (i) determines a first subset of pixels based on tracing rays from pixels of the video display the pixels of the first camera, and (ii) determines a second subset of pixels based on tracing rays from pixels of the video display to pixels of the second camera. The system buffers the first and second subset of pixels and generates display frames of image data using the buffered pixels. The system displays video images derived from the display frames of image data.

20 Claims, 13 Drawing Sheets

(56) References Cited

U.S. PATENT DOCUMENTS

| | | |
|---|---|---|
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,116,743 A | 9/2000 | Hoek |
| 6,139,172 A | 10/2000 | Bos et al. |
| 6,144,022 A | 11/2000 | Tenenbaum et al. |
| 6,148,120 A | 11/2000 | Sussman |
| 6,173,087 B1 | 1/2001 | Kumar et al. |
| 6,175,300 B1 | 1/2001 | Kendrick |
| 6,184,781 B1 | 2/2001 | Ramakesavan |
| 6,198,409 B1 | 3/2001 | Schofield et al. |
| 6,201,642 B1 | 3/2001 | Bos |
| 6,226,061 B1 | 5/2001 | Tagusa |
| 6,259,412 B1 | 7/2001 | Duroux |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,329,925 B1 | 12/2001 | Skiver et al. |
| 6,333,759 B1 | 12/2001 | Mazzilli |
| 6,353,392 B1 | 3/2002 | Schofield et al. |
| 6,359,392 B1 | 3/2002 | He |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,424,273 B1 | 7/2002 | Gutta et al. |
| 6,430,303 B1 | 8/2002 | Naoi et al. |
| 6,433,817 B1 | 8/2002 | Guerra |
| 6,442,465 B2 | 8/2002 | Breed et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,515,378 B2 | 2/2003 | Drummond et al. |
| 6,523,964 B2 | 2/2003 | Schofield et al. |
| 6,539,306 B2 | 3/2003 | Turnbull |
| 6,553,130 B1 | 4/2003 | Lemelson et al. |
| 6,559,435 B2 | 5/2003 | Schofield et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,672,731 B2 | 1/2004 | Schnell et al. |
| 6,678,056 B2 | 1/2004 | Downs |
| 6,690,268 B2 | 2/2004 | Schofield et al. |
| 6,693,524 B1 | 2/2004 | Payne |
| 6,700,605 B1 | 3/2004 | Toyoda et al. |
| 6,703,925 B2 | 3/2004 | Steffel |
| 6,704,621 B1 | 3/2004 | Stein et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,744,353 B2 | 6/2004 | Sjonell |
| 6,757,109 B2 | 6/2004 | Bos |
| 6,762,867 B2 | 7/2004 | Lippert et al. |
| 6,795,221 B1 | 9/2004 | Urey |
| 6,802,617 B2 | 10/2004 | Schofield et al. |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,831,261 B2 | 12/2004 | Schofield et al. |
| 6,864,930 B2 | 3/2005 | Matsushita et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,202,776 B2 | 4/2007 | Breed |
| 7,227,459 B2 | 6/2007 | Bos et al. |
| 7,227,611 B2 | 6/2007 | Hull et al. |
| 7,253,723 B2 | 8/2007 | Lindahl et al. |
| 7,307,655 B1 | 12/2007 | Okamoto et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,339,149 B1 | 3/2008 | Schofield et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,423,821 B2 | 9/2008 | Bechtel et al. |
| 7,425,076 B2 | 9/2008 | Schofield et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,566,851 B2 | 7/2009 | Stein et al. |
| 7,602,412 B2 | 10/2009 | Cutler |
| 7,605,856 B2 | 10/2009 | Imoto |
| 7,633,383 B2 | 12/2009 | Dunsmoir et al. |
| 7,639,149 B2 | 12/2009 | Katoh |
| 7,655,894 B2 | 2/2010 | Schofield et al. |
| 7,676,087 B2 | 3/2010 | Dhua et al. |
| 7,710,463 B2 | 5/2010 | Foote |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,855,755 B2 | 12/2010 | Weller et al. |
| 7,855,778 B2 | 12/2010 | Yung et al. |
| 7,881,496 B2 | 2/2011 | Camilleri et al. |
| 7,914,187 B2 | 3/2011 | Higgins-Luthman et al. |
| 7,929,751 B2 | 4/2011 | Zhang et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,098,142 B2 | 1/2012 | Schofield et al. |
| 8,150,210 B2 | 4/2012 | Chen et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |

(56) References Cited

U.S. PATENT DOCUMENTS

| | | |
|---|---|---|
| 8,446,470 B2 | 5/2013 | Lu et al. |
| 8,452,055 B2 | 5/2013 | Stein et al. |
| 8,553,088 B2 | 10/2013 | Stein et al. |
| 8,643,724 B2 | 2/2014 | Schofield et al. |
| 8,692,659 B2 | 4/2014 | Schofield et al. |
| 9,900,522 B2 | 2/2018 | Lu |
| 10,187,590 B2 | 1/2019 | Fluegel |
| 2001/0002451 A1 | 5/2001 | Breed |
| 2002/0005778 A1 | 1/2002 | Breed et al. |
| 2002/0011611 A1 | 1/2002 | Huang et al. |
| 2002/0113873 A1 | 8/2002 | Williams |
| 2003/0068098 A1 | 4/2003 | Rondinelli et al. |
| 2003/0085999 A1 | 5/2003 | Okamoto et al. |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0078052 A1 | 4/2005 | Morichika |
| 2005/0219852 A1 | 10/2005 | Stam et al. |
| 2005/0237385 A1 | 10/2005 | Kosaka et al. |
| 2006/0015554 A1 | 1/2006 | Umezaki et al. |
| 2006/0018511 A1 | 1/2006 | Stam et al. |
| 2006/0018512 A1 | 1/2006 | Stam et al. |
| 2006/0029255 A1 | 2/2006 | Ozaki |
| 2006/0066730 A1 | 3/2006 | Evans et al. |
| 2006/0091813 A1 | 5/2006 | Stam et al. |
| 2006/0103727 A1 | 5/2006 | Tseng |
| 2006/0125921 A1 | 6/2006 | Foote |
| 2006/0250501 A1 | 11/2006 | Wildmann et al. |
| 2007/0024724 A1 | 2/2007 | Stein et al. |
| 2007/0041659 A1 | 2/2007 | Nobori et al. |
| 2007/0104476 A1 | 5/2007 | Yasutomi et al. |
| 2007/0236595 A1 | 10/2007 | Pan et al. |
| 2007/0242339 A1 | 10/2007 | Bradley |
| 2007/0291189 A1 | 12/2007 | Harville |
| 2008/0012879 A1 | 1/2008 | Clodfelter |
| 2008/0043099 A1 | 2/2008 | Stein et al. |
| 2008/0147321 A1 | 6/2008 | Howard et al. |
| 2008/0170803 A1 | 7/2008 | Forutanpour |
| 2008/0192132 A1 | 8/2008 | Bechtel et al. |
| 2008/0266396 A1 | 10/2008 | Stein |
| 2009/0022422 A1 | 1/2009 | Sorek et al. |
| 2009/0113509 A1 | 4/2009 | Tseng et al. |
| 2009/0153549 A1 | 6/2009 | Lynch et al. |
| 2009/0160987 A1 | 6/2009 | Bechtel et al. |
| 2009/0175492 A1 | 7/2009 | Chen et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2010/0014770 A1 | 1/2010 | Huggett et al. |
| 2010/0134325 A1 | 6/2010 | Gomi et al. |
| 2011/0032357 A1 | 2/2011 | Kitaura et al. |
| 2011/0156887 A1 | 6/2011 | Shen et al. |
| 2011/0164108 A1 | 7/2011 | Bates et al. |
| 2011/0175752 A1 | 7/2011 | Augst |
| 2011/0216201 A1 | 9/2011 | McAndrew et al. |
| 2012/0045112 A1 | 2/2012 | Lundblad et al. |
| 2012/0069185 A1 | 3/2012 | Stein |
| 2012/0154591 A1 * | 6/2012 | Baur .................... H04N 7/183 348/148 |
| 2012/0200707 A1 | 8/2012 | Stein et al. |
| 2012/0212480 A1 | 8/2012 | Cho et al. |
| 2012/0314071 A1 | 12/2012 | Rosenbaum et al. |
| 2012/0320209 A1 | 12/2012 | Vico et al. |
| 2013/0141580 A1 | 6/2013 | Stein et al. |
| 2013/0147957 A1 | 6/2013 | Stein |
| 2013/0162828 A1 | 6/2013 | Higgins-Luthman |
| 2013/0169812 A1 | 7/2013 | Lu et al. |
| 2013/0286193 A1 | 10/2013 | Pflug |
| 2014/0022378 A1 | 1/2014 | Higgins-Luthman |
| 2014/0043473 A1 | 2/2014 | Gupta et al. |
| 2014/0063254 A1 | 3/2014 | Shi et al. |
| 2014/0098229 A1 * | 4/2014 | Lu ........................ H04N 7/181 348/148 |
| 2014/0152778 A1 | 6/2014 | Ihlenburg et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2016/0096477 A1 | 4/2016 | Biemer |
| 2016/0253883 A1 * | 9/2016 | Westmacott ........... H04N 7/181 348/159 |
| 2019/0199937 A1 | 6/2019 | Fluegel |
| 2020/0310537 A1 * | 10/2020 | Simmons ........... G02B 27/0172 |

\* cited by examiner

US 11,910,123 B2

SYSTEM FOR PROCESSING IMAGE DATA FOR DISPLAY USING BACKWARD PROJECTION

CROSS REFERENCE TO RELATED APPLICATIONS

The present application is a continuation of U.S. patent application Ser. No. 16/252,871, filed Jan. 21, 2019, which is a continuation of U.S. patent application Ser. No. 15/334,365, filed Oct. 26, 2016, now U.S. Pat. No. 10,187,590, which claims the filing benefits of U.S. provisional application Ser. No. 62/246,870, filed Oct. 27, 2015, which are hereby incorporated herein by reference in their entireties.

FIELD OF THE INVENTION

The present invention relates generally to a vehicle vision system for a vehicle and, more particularly, to a vehicle vision system that utilizes two or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes two or more cameras (preferably two or more CMOS cameras) to capture image data representative of images exterior of the vehicle, and provides enhanced image processing of the captured image data to provide a display of images derived from image data captured by two or more cameras, utilizing backward projection and tracing rays from the display plane (pixel) grid (backwards) to one or more source camera (pixel) grid(s) under regard of the warping and unwarping schemes of the camera and the virtual view or views which are to be generated.

The projection pixel data handling is thus reduced to just those pixels that find use on the display, which saves processing capacity (FPGA, GPU or Processor), RAM space and bus resources of the image data processing system. The system or solution of the present invention thus saves about 25 percent or more of processing power or use of the processor and FPGA processing resources and reduces the Block RAM consumption.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
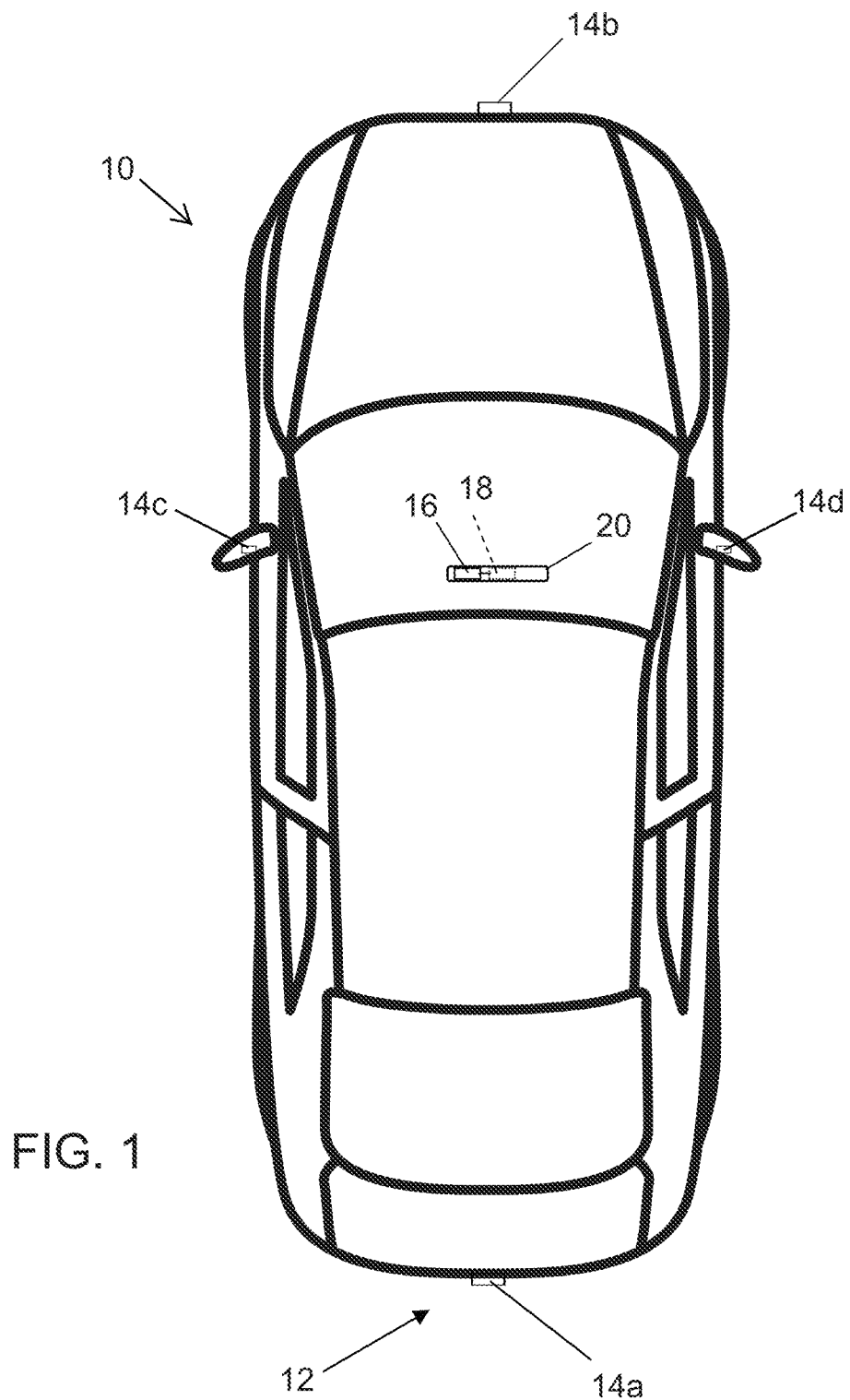
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides enhanced vehicle multi-camera vision processing. Normal view and fish eye view cameras disposed at a vehicle so as to have exterior fields of view provide image data streams, which get communized in one or more altered or artificial views, such as a top down bird's eye view or the like, for being displayed to the driver of the vehicle on a display, projector or head up display or the like, or are processed by an advanced driver assistance system (ADAS) machine vision processing algorithm. For that, the source images get unwrapped/undistorted, cropped and mathematically projected to a virtual view plane, partially alpha blended and overlayed with augmentations. The processing is done in real time, which means frame wise image capturing and displaying at a frame rate typically at 15 f/s (frames per second), 30 f/s or 60 f/s or the like. The image processing path from the cameras to one or more artificial views requires substantial amounts of processing performance in processors, FPGAs and/or GPUs as well as vehicle communication bus capacity and RAM space may these be located in the cameras, in an ECU the cameras are connected at or at a target display device with processing capabilities such as a head unit.

In special-view systems, the 2D grid or array of camera pixels does not correspond to the 2D screen pixel grid. A projection algorithm is required to transform the 2D camera grid into the 2D screen grid. Several camera inputs may be combined at a single screen.

Current solutions are based on screen-to-camera projection. The system solution according to the present invention is implemented as backward projection, tracing rays from the display plane (pixel) grid (backwards) to one or more source camera (pixel) grid(s) under regard of the warping and unwarping schemes of the camera and the virtual view or views which are to be generated. Due to that measure, the projection pixel data handling is reduced to just these pixels which really find use on the display which saves processing capacity (FPGA, GPU or Processor), RAM space and bus resources of the image data processing system.

The following description may imply a four camera architecture with the camera's imagers connected (via monodirectional or bidirectional data busses) to an ECU which bears the processing capabilities such as having one or more microprocessor cores, one or more FPGAs and RAM either integrated or extra, such as shown in FIG. 1. An alternative architecture with having the processing capabilities fully or mostly incorporate to one camera or multiple cameras will be discussed further below.

Figure 2A:
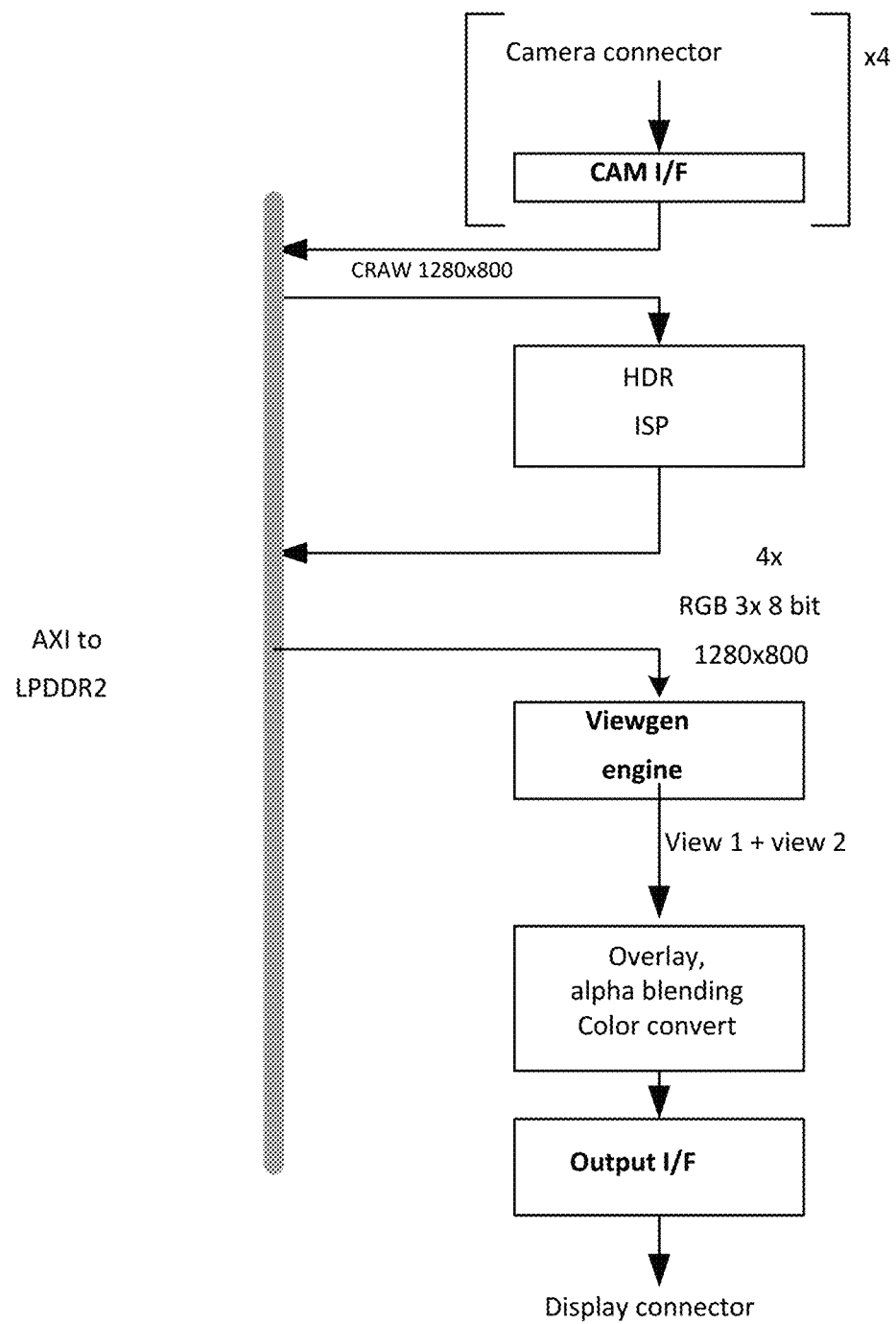
FIGS. 2A and 2B show image data flow of a prior art system.
Figure 2B:
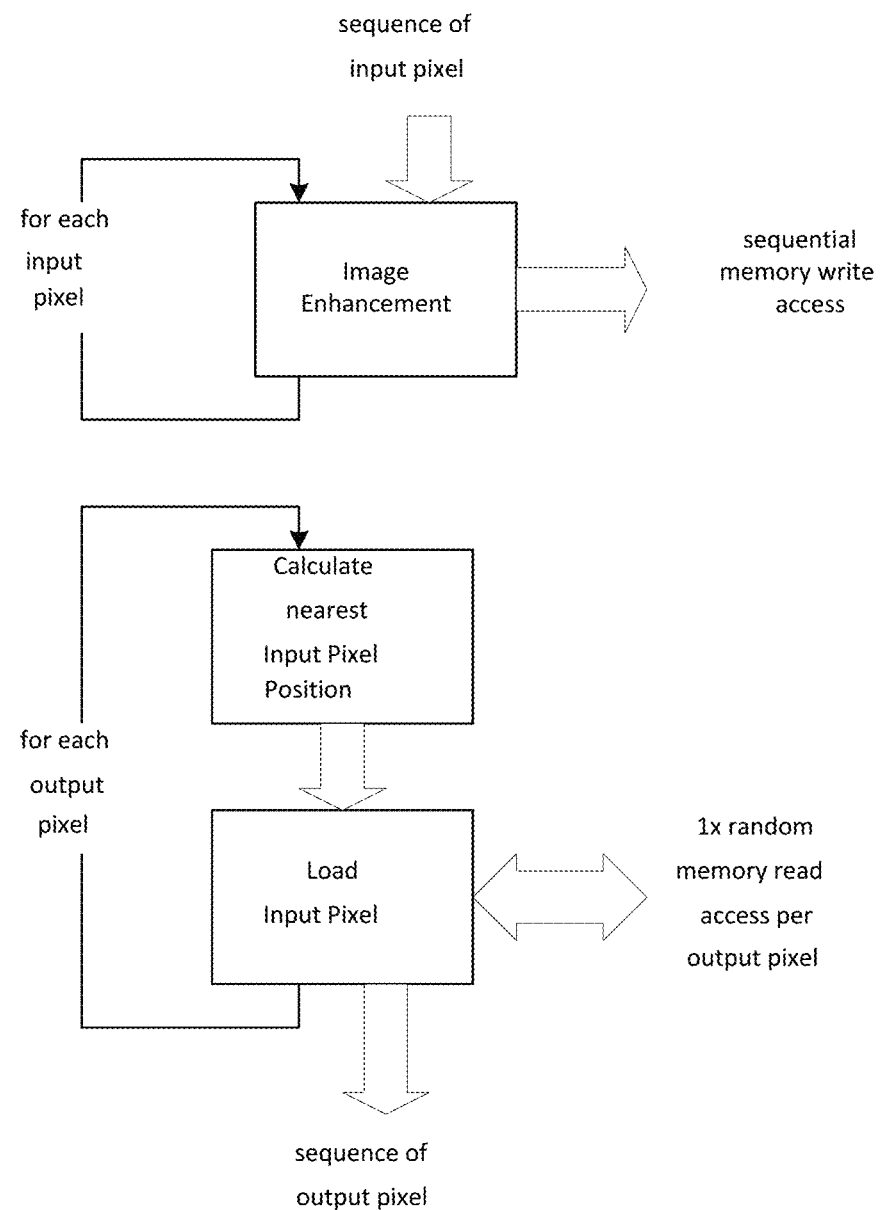
Figure 3:
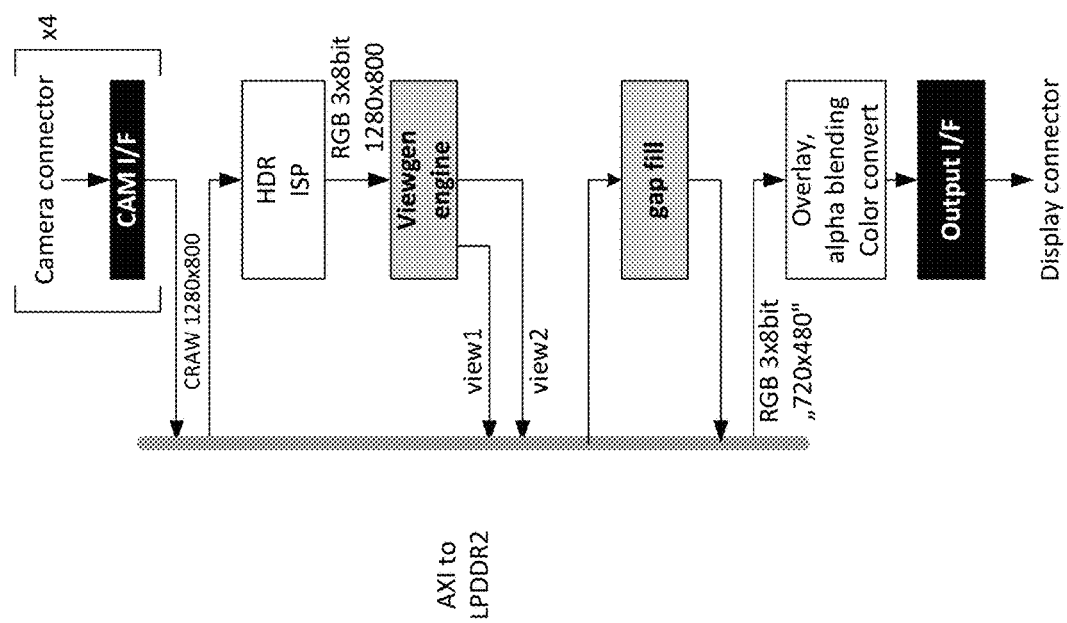
FIG. 3 shows image data flow in accordance with the system of the present invention.
Figure 4:
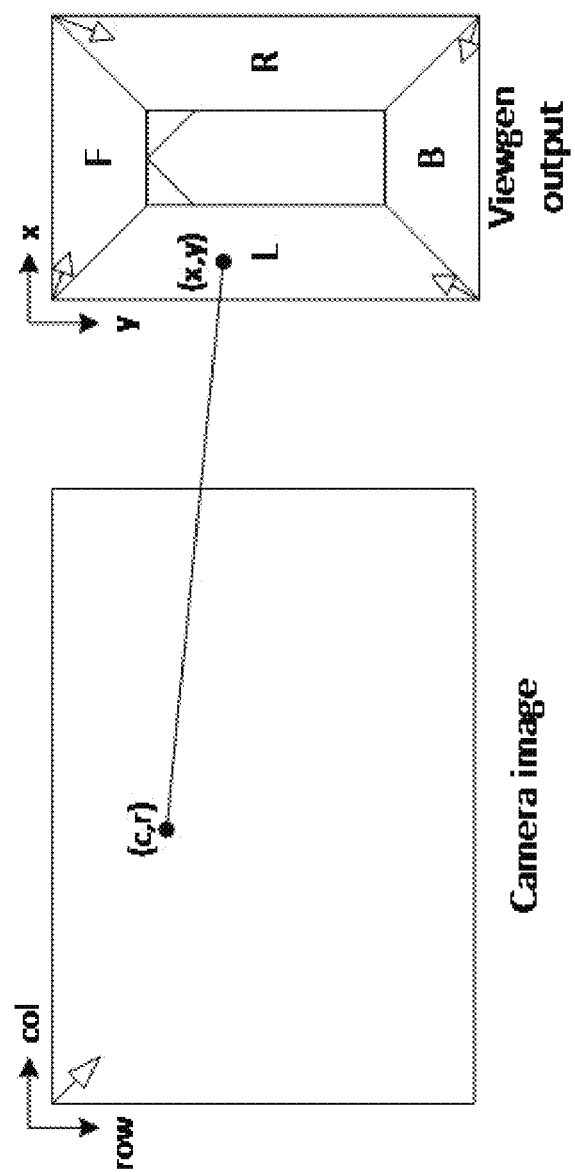
FIG. 4 shows a projection coordinate scheme for the system of the present invention.
Figure 5:
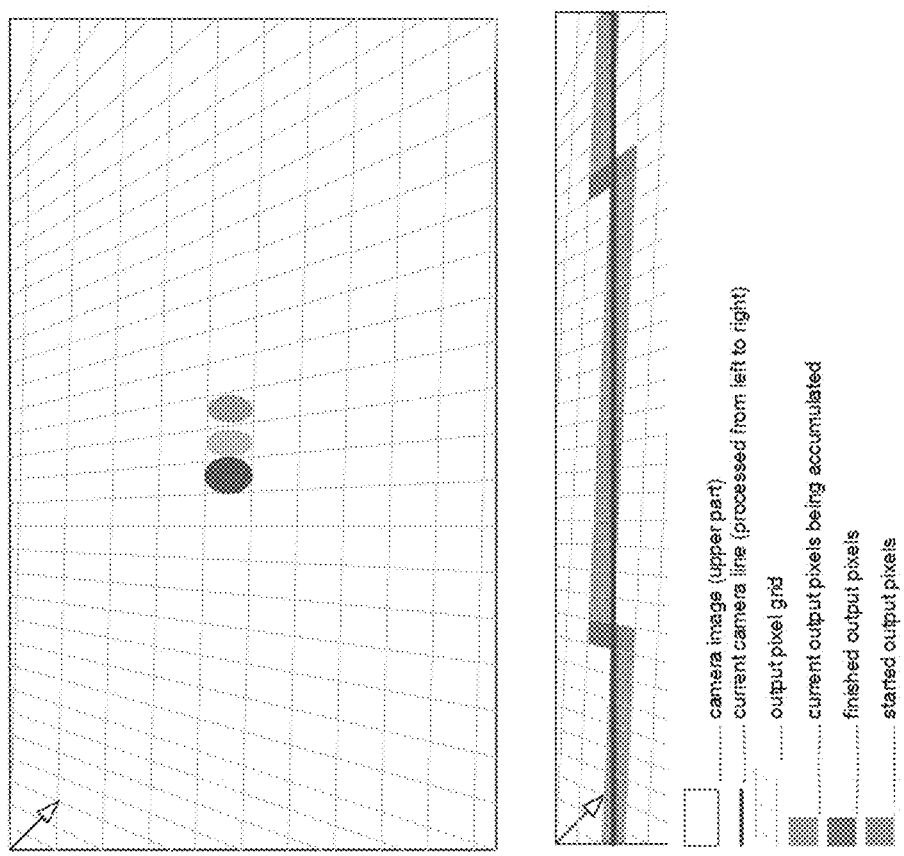
FIG. 5 shows mapping of a camera pixel to a top view pixel within the output [display] pixel grid in accordance with the system of the present invention.
Figure 6:
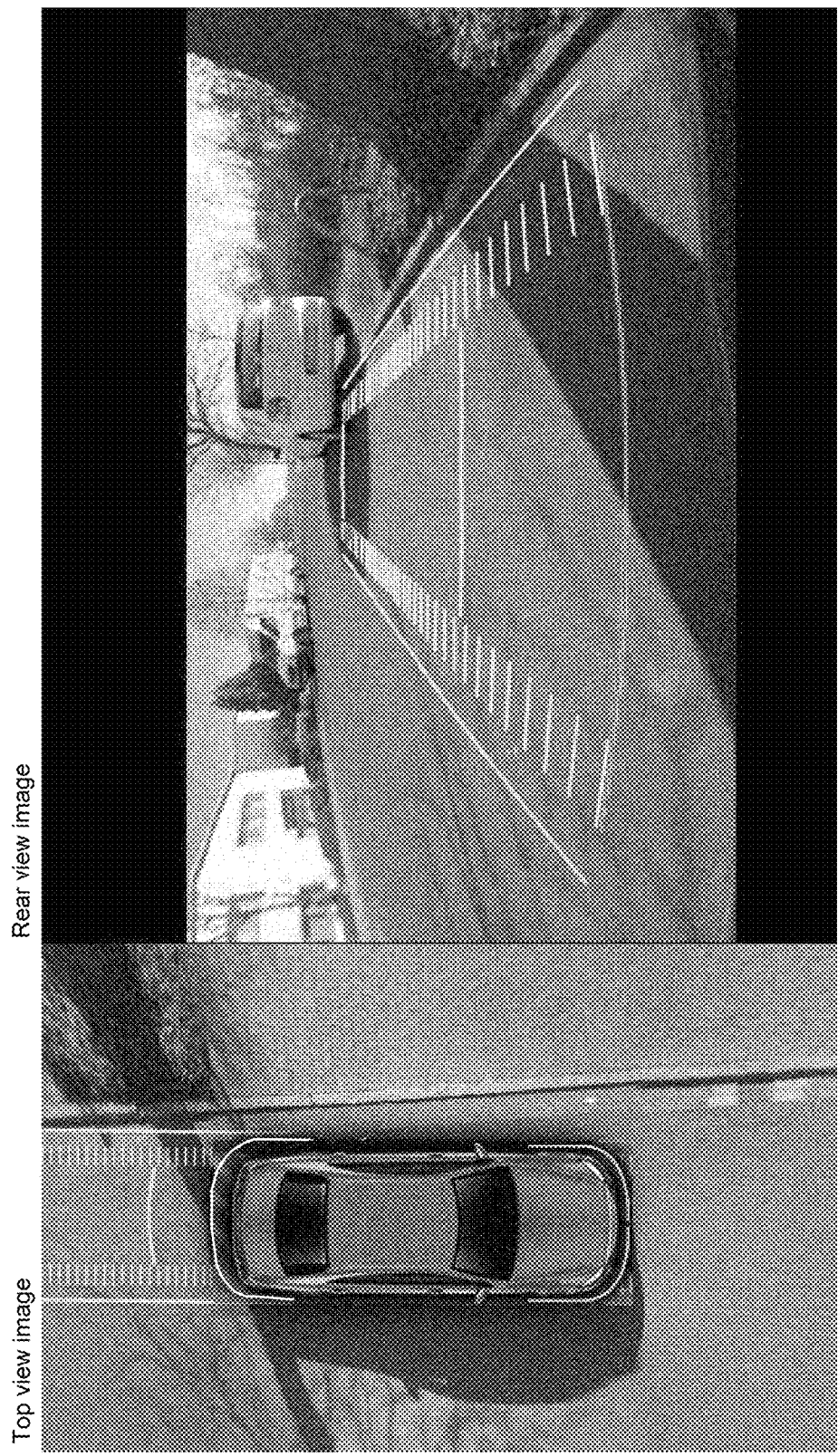
FIG. 6 shows the display output having a top view display and a rear view image display in combination, with the top view generated from outputs of four cameras, and with an ego vehicle and driving aids overlayed on the displayed images.

Instead of buffering all (at a surround view vision system typically four, but more are possible) camera image pixels (of one frame) in the vision system's RAM such as the FPGAs Block RAM (optionally after passing an High Dynamic Range Image Processing (HDR ISP) algorithm) for sourcing the virtual projection processing such as shown in FIG. 2A, the system may just store the source pixels (already debayered by the ISP) that are necessary for the display output image (see FIGS. 3 and 4). In the given illustrated examples, it may be assumed an 888 RGB may find use. As an alternative option, the image processing may be done in 10-8-6 RGB or 10-7-7 RGB. For that, one or more projection units may be present behind the HDR ISP for distributing the according pixels out of the incoming image data streams. A top view image is generated out of four projection planes which may have one projection unit each (see FIG. 5). Often the display is sharing another (e.g., user chosen or selected) view such as a rear view image with the top view image (see FIG. 6) which generation requires an additional projection unit. Although shown in FIG. 6 as including a rear view image and top view image, the system may also provide a forward view image and top view image to assist the driver in parking the vehicle.

Figure 7:
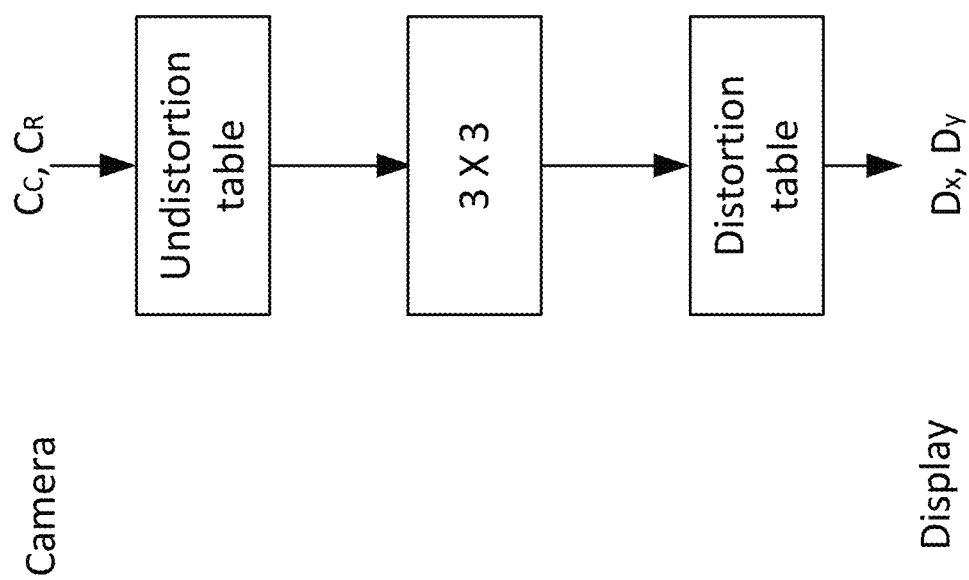
FIG. 7 is a block diagram of an image projection unit in accordance with the present invention.

Each projection unit may comprise an undistortion table, representing the camera lens parameters followed by a 3×3 vector table which is view dependent, followed by a distortion table, representing the target view distortion (see FIG. 7). Each camera sends its each column's pixels in sequence row by row (Cc=Camera column coordinate; Cr=Camera row coordinate). The (back-) projection unit addresses each pixel into an accumulator bin (Dx=Display x coordinate, Dy=Display y coordinate), see FIG. 5 (where the regions of camera pixels are projected to the same screen pixel, and all camera pixel values in the region are averaged). The system uses W accumulators and processes image data in camera scan order. A pixel value is added to the projected accumulator. If screen_y is below accu_y, the old accu is divided by the number of pixels and the average is written to SDRAM, and a new accumulation is started with the current pixels.

Figures 8, 9:
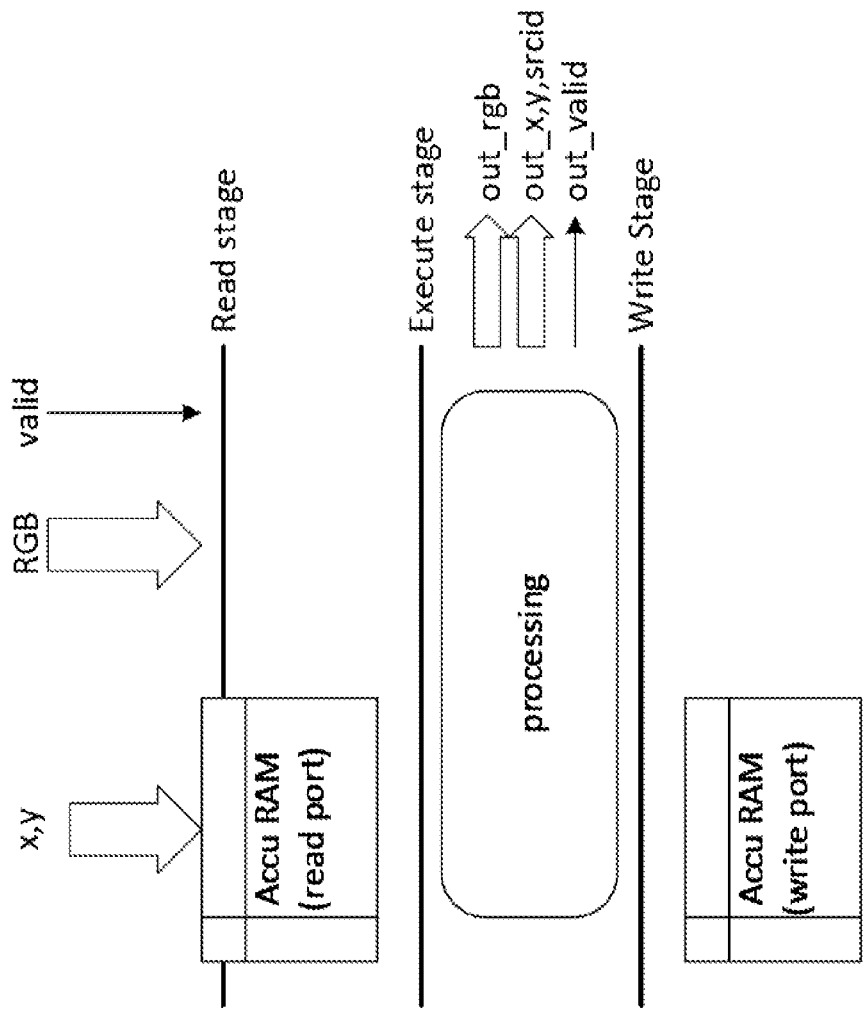
FIG. 8 is an accumulator block diagram and table.
FIG. 9 is an accumulator flowchart in accordance with the present invention.

By that, the camera pixel content is condensed at the time of transmission of the data stream without storing whole camera images but just the display view image instead in the desired size and resolution and possibly cropped. In some image regions, multiple camera pixels of a single camera source get projected to the same display (or screen) pixel, typically those at which the density of camera pixels exceed the density of target elements (display pixels) due to distortion. Due to that, target pixels may be generated by having accumulators (W) (or bins) at which multiple source pixels get blended into one target pixel (see FIGS. 8 and 9). The system may manage the AccuRAM (FIGS. 8 and 9) and accumulate RGB values and divide by the number of accumulated pixels. The blending may be done by arithmetic averaging. As an alternative slightly more complex option, the averaging may be done by arithmetic—geometric averaging or as preferred alternative option by geometric averaging in accordance to the x, y subpixel displacement. By that, the camera pixel projected closer to the target display pixel may be reflected stronger in the resulting bin value than those which are projected father away (two dimensional by that geometric).

Figure 10:
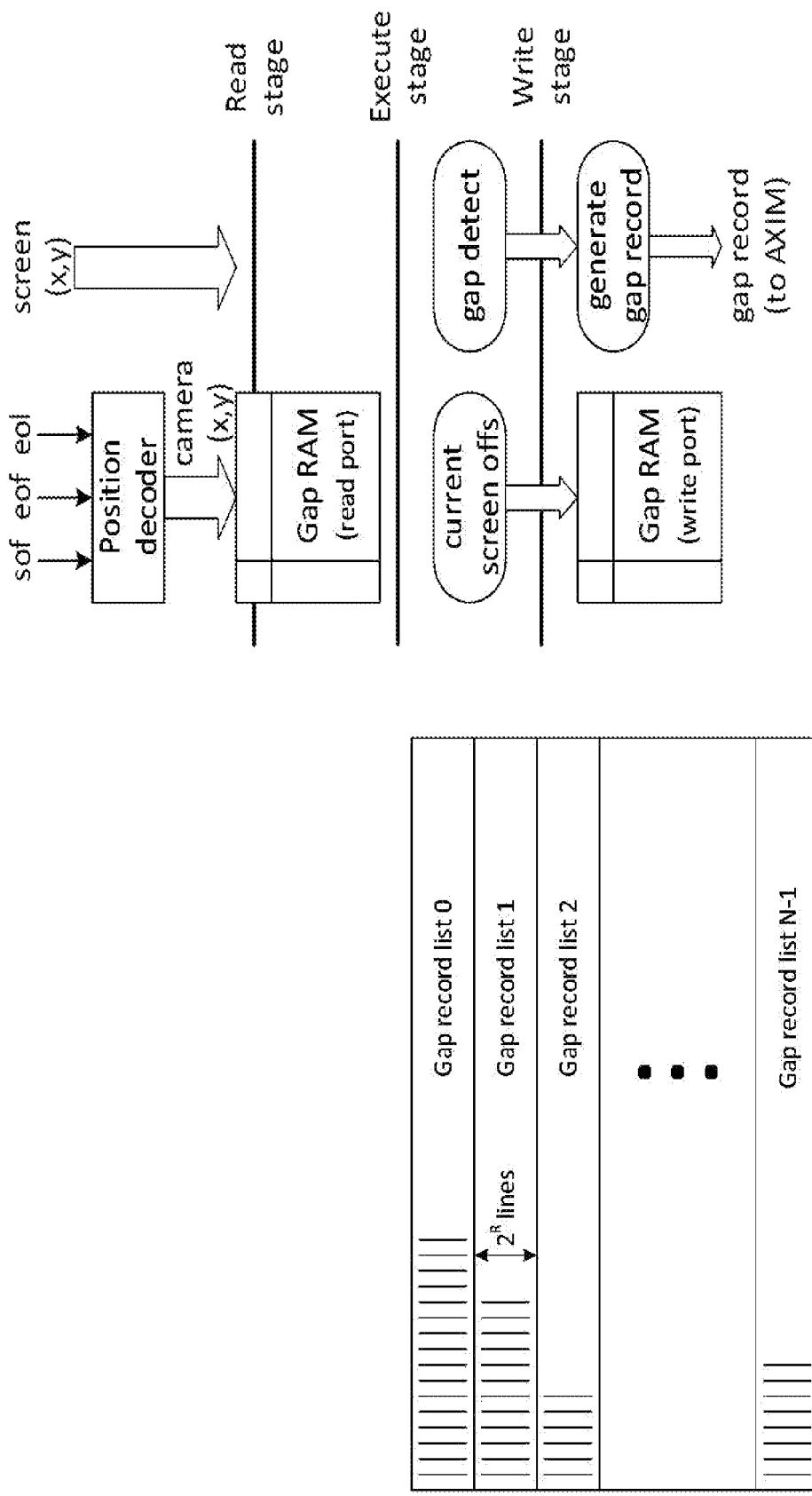
FIG. 10 is a gap flowchart and block diagram in accordance with the present invention.
Figure 11:
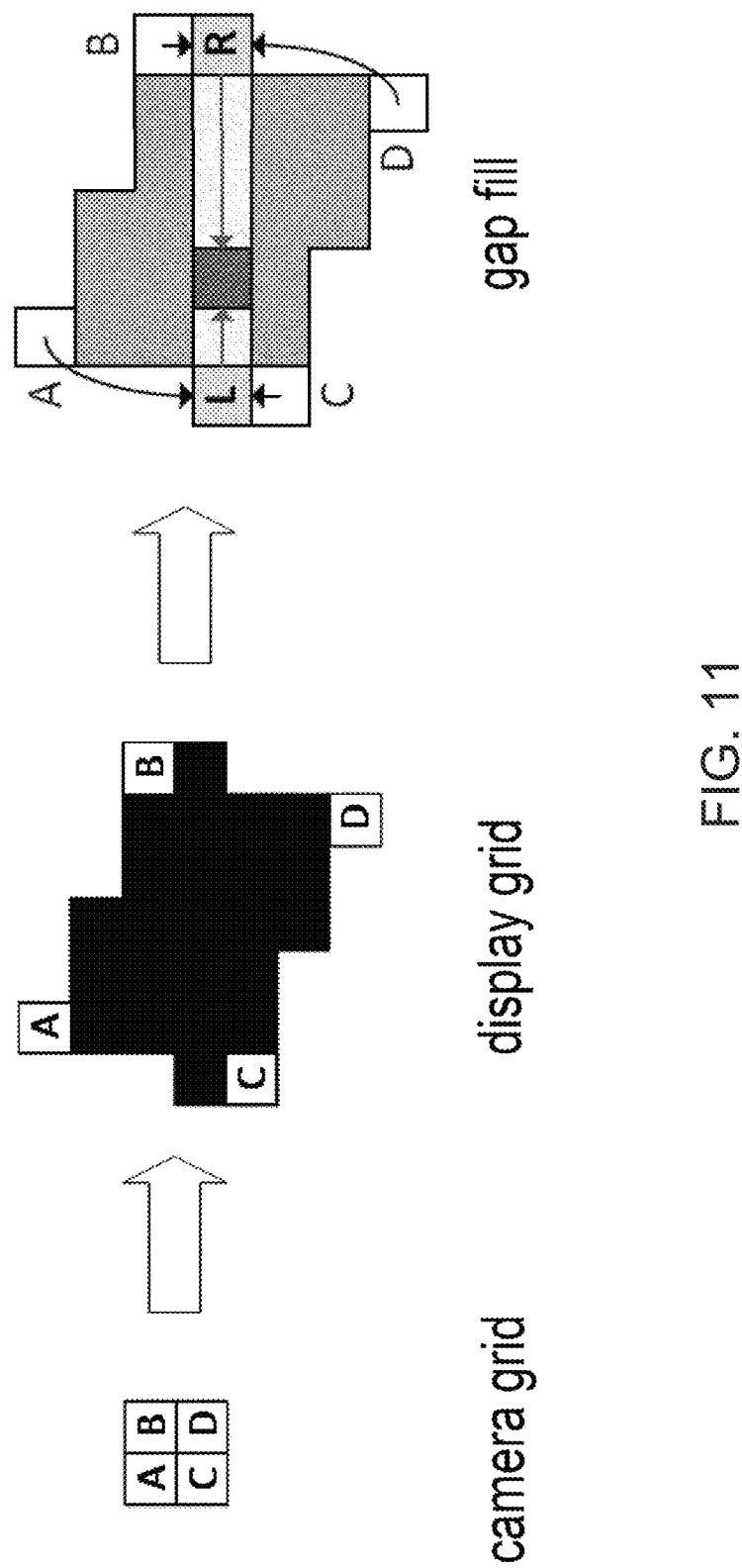
FIG. 11 is a schematic showing gap filling in accordance with the present invention.
Figure 12:
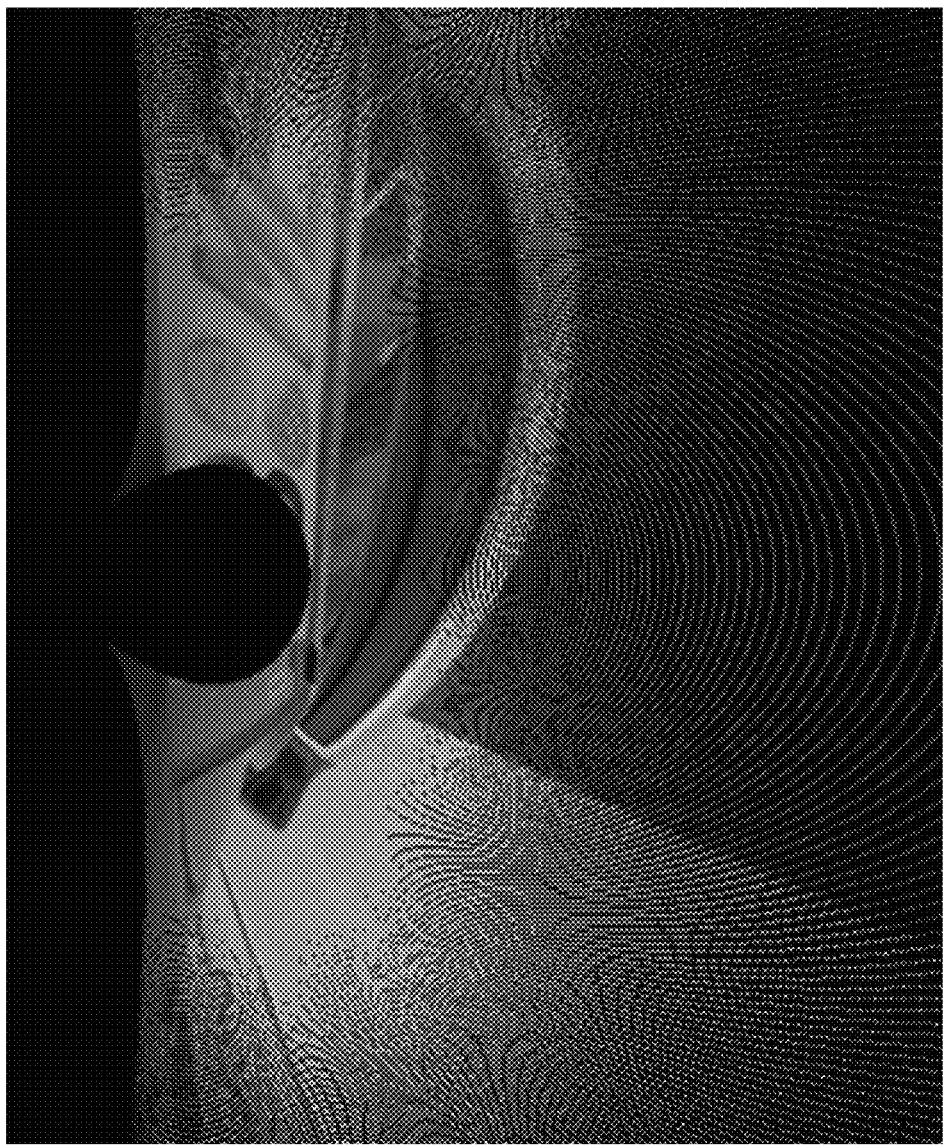
FIG. 12 is an image shown as a stretched region of video images without filled gaps.

As can be seen in FIG. 12, in some target image regions not for all display pixel (Dx, Dy) a camera source pixel is present (also due to distortion), these pixels get marked as 'gaps'. The gaps may be stored in a list within the device memory. Optionally, the gaps may be expressed as a polygon, where the polygon corners are defined by the location of surrounding valid image elements. Due to economic reasons, the gap flags may be recorded primarily (see FIG. 10). The system may manage the GapRAM (projection of vectors of previous camera line) and detect gaps between projection vectors and generate gap records (grounded by lines on the screen). A consecutive stage 'gap fill' (see FIG. 3) may be executed consecutively to the projection unit, optionally one for each unit. The gap fill stage will fill the empty target image elements or display pixel region with a blend or interpolation of the borderlining existing pixels (flagged as 'no gap') (see FIG. 11). Optionally, the gap fill will be done line-by-line or column-by-column of target image elements or pixels.

The blending may be done optionally by a decreasing factor depending on how far the gap pixel is away from a borderlining source pixel, done according each borderlining pixel. As an alternative option, the blending may be done by just filling the gap pixels between the borderlining pixels with the arithmetic average of all true borderlining pixels. As an alternative option, the blending may be done by filling the gap pixels by dithering duplications of all borderlining pixels, optionally under reflection of the color and brightness average and optionally by imitating the pixel noise level of that region or the whole image. By that a more noise night view image may have a more dithered noise inserted to the gap pixels than a smooth bright daylight image. The dithering may be accurate to hide the Moire pattern-like structure caused by the distortion and stretching of the camera grid as to be seen in FIG. 12.

The gap fill processing may be done in three steps: In the first step, the image processing device may calculate the two intersection points between the current line or column and the edges of the gap polygon. In the second step, the image processing device may calculate the values of each intersection point from the values of the two corner points of the crossed polygon edge. In the third step, the image processing device may calculate the values of the target image elements between the intersections from the values of the intersection points.

The target (displayed) image possesses zones at which two camera's (partial) image borderlines overlap (on purpose). These may be blended by alpha blending as the primary step before finally displaying.

Figure 13:
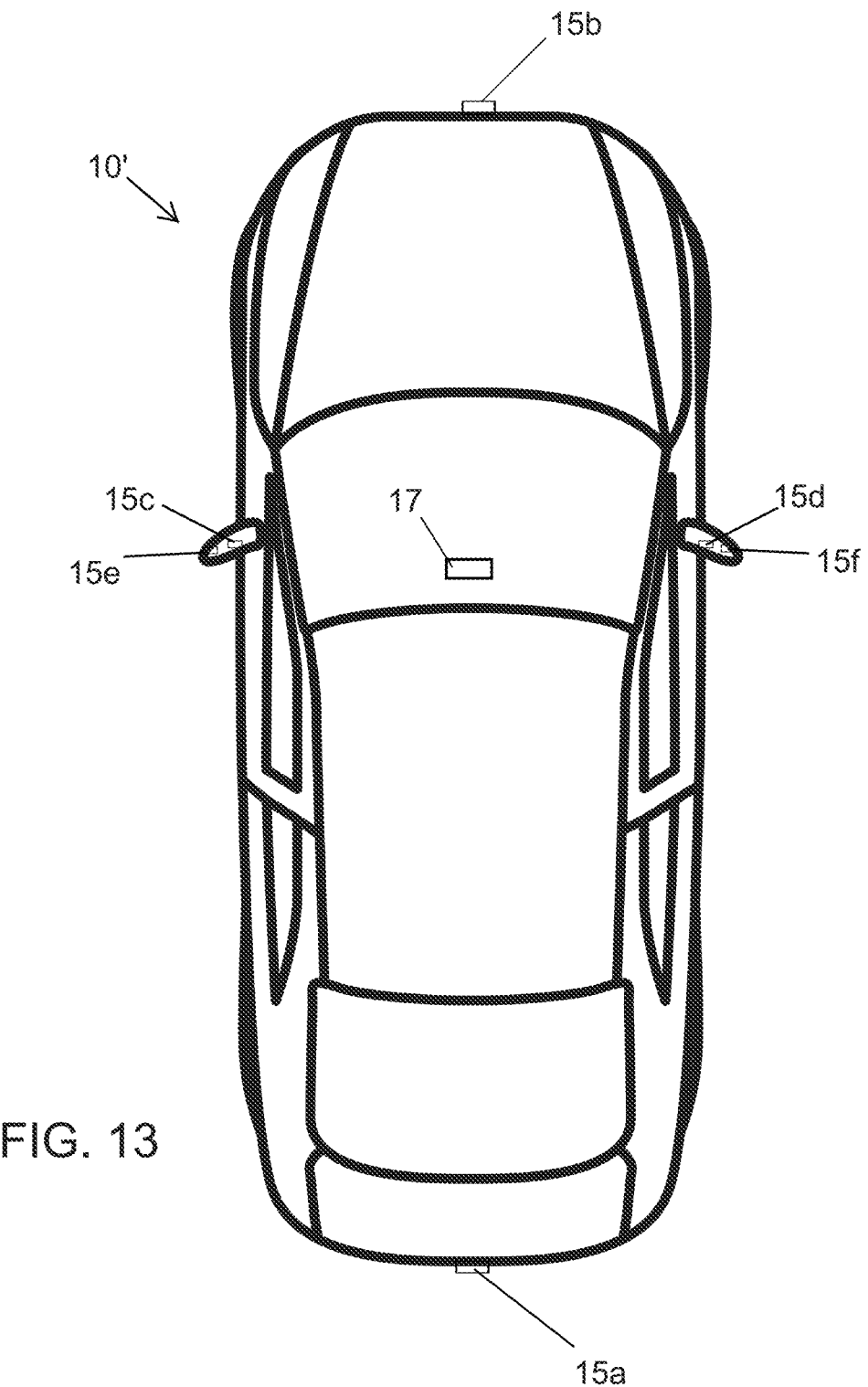
FIG. 13 is a view of a vehicle with one master camera and three slave cameras and a display for a surround vision system in accordance with the present invention.

As an optional alternative, the surround vision system according to the present invention may have an architecture having the processing capabilities fully or mostly incorporated to one camera or multiple cameras instead of having it on an ECU. The ECU may be spared entirely. FIG. 13 shows a vehicle 10' having one master-camera 15a at the vehicle's rear and three slave cameras 15b, 15c and 15d at the side and at the front of the vehicle, all viewing outward or exterior or outbound from the vehicle. Optionally, the system may have just the front and the rear camera 15a and 15b. Optionally, side rearview mirror cameras with small opening angle to the rear or shift lens optics with high pixel density to the rear and opening to the blind spot region with reduced pixel density may be used additionally or instead of the slave cameras 15c and 15d. Optionally, there may be an additional rear only side camera 15e and 15f integrated in the side mirror region, optionally combined with 15c and 15d in one wing each carrying two slave cameras.

The master camera may have a monodirectional or bidirectional vision data and control line or bus to the display device 17, which may be vehicle cluster attached or integrated, head unit attached or integrated, or a head up display, projector or TFT, optionally comprising a light field display which may be visible on the bottom or top of the windshield or at a combiner or at a screen on the rearview mirror position. The slave cameras may be connected to the master camera via a bidirectional vision data and control data line or bus. All data lines may optionally also carry the supply power. The vision data may optionally be compressed via a compression codec before transmission. The used codec may be H.264, H.262, H.263, H.265, MPEG1, MPEG2, MPEG3, JPEG2000 besides others. In case compression is used, the slave cameras may run a compression algorithm before transmitting image data to the master camera. Optionally, the slave cameras send their full image data streams to the master camera which is accumulating the required display pixels in accumulator bins (in the manner as the ECU referred above) coming from its own imager and from the slave cameras. The master camera also processes the gap filling. The master camera may decompress the data before further processing. Optionally, the master camera may compress the display image before transmission to the display device 17.

In a more advanced alternative option, the slave cameras may run the projection unit and hold the accumulator bins. The slave cameras may not send the full images but just the accumulator bins content to the master camera. The master camera may carry out the accumulation of the own imagers' image data and the gap filling before sending the display image to the display 17. The system may utilize aspects of the vision systems described in U.S. Publication No. US-2014-0152778, which is hereby incorporated herein by reference in its entirety.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the video display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a first camera disposed at a vehicle equipped with the vehicular vision system and viewing exterior of the vehicle, wherein the first camera comprises a first two dimensional array of photosensing pixels, and wherein the first camera captures frames of first image data;

a second camera disposed at the vehicle and viewing exterior of the vehicle, wherein the second camera comprises a second two dimensional array of photosensing pixels, and wherein the second camera captures frames of second image data;

an electronic control unit (ECU) comprising electronic circuitry and associated software;

wherein the electronic circuitry of the ECU comprises an image processor for processing frames of first image data captured by the first camera and frames of second image data captured by the second camera;

a video display disposed in the vehicle and operable to display video images derived from frames of first image data captured by the first camera and frames of second image data captured by the second camera;

wherein, responsive to a view selection input selecting a view for the video display, the vehicular vision system (i) determines a first subset of the first two dimensional array of photosensing pixels based on tracing rays from pixels of the video display using the selected view to the first two dimensional array of photosensing pixels, and (ii) determines a second subset of the second two dimensional array of photosensing pixels based on tracing rays from pixels of the video display using the selected view to the second two dimensional array of photosensing pixels;

wherein the vehicular vision system, while capturing first frames of first image data with the first camera, buffers the first subset of the first two dimensional array of photosensing pixels of each first frame of first image data;

wherein the vehicular vision system, while capturing second frames of second image data with the second camera, buffers the second subset of the second two dimensional array of photosensing pixels of each second frame of second image data;

wherein the vehicular vision system, using the ECU, generates display frames of image data using the buffered first subset of the first two dimensional array of photosensing pixels of the first frames of first image data and the buffered second subset of the second two dimensional array of photosensing pixels of the second frames of second image data; and wherein the video display displays video images derived from the display frames of image data.

2. The vehicular vision system of claim 1, wherein a field of view of the first camera partially overlaps the field of view of the second camera.

3. The vehicular vision system of claim 1, wherein pixels of the first two dimensional array of photosensing pixels that are not within the first subset of the first two dimensional array of photosensing pixels are not buffered.

4. The vehicular vision system of claim 3, wherein pixels of the second two dimensional array of photosensing pixels that are not within the second subset of the second two dimensional array of photosensing pixels are not buffered.

5. The vehicular vision system of claim 1, wherein a single pixel of the video display traces to a plurality of pixels of the first two dimensional array of photosensing pixels.

6. The vehicular vision system of claim 5, wherein a value of the single pixel of the video display is based on a blending of each of the plurality of pixels of the first two dimensional array of photosensing pixels.

7. The vehicular vision system of claim 6, wherein the blending comprises averaging each of the plurality of pixels of the first two dimensional array of photosensing pixels.

8. The vehicular vision system of claim 1, wherein the vehicular vision system determines a pixel of the video display that fails to trace to any pixel of the first two dimensional array of photosensing pixels and the second two dimensional array of photosensing pixels.

9. The vehicular vision system of claim 8, wherein the vehicular vision system, responsive to determining the pixel of the video display that fails to trace to any pixel, interpolates a value for the pixel of the video display based on two or more pixels of the first two dimensional array of photosensing pixels or the second two dimensional array of photosensing pixels.

10. The vehicular vision system of claim 8, wherein the vehicular vision system determines a plurality of pixels of the video display that fail to trace to any pixel of the first two dimensional array of photosensing pixels and the second two dimensional array of photosensing pixels, and wherein the vehicular vision system represents the plurality of pixels of the video display as a polygon.

11. A vehicular vision system, the vehicular vision system comprising:

a plurality of cameras disposed at a vehicle equipped with the vehicular vision system and viewing exterior of the vehicle, wherein each camera of the plurality of cameras comprises a respective two dimensional array of photosensing pixels, and wherein each camera of the plurality of cameras captures frames of image data;

an electronic control unit (ECU) comprising electronic circuitry and associated software;

wherein the electronic circuitry of the ECU comprises an image processor for processing frames of image data captured by each camera of the plurality of cameras;

a video display disposed in the vehicle and operable to display video images derived from frames of image data captured by the plurality of cameras;

wherein, responsive to a view selection input selecting a view for the video display, the vehicular vision system, for at least some of the plurality of cameras, determines a respective subset of the respective two dimensional array of photosensing pixels based on tracing rays from pixels of the video display using the selected view to the respective two dimensional array of photosensing pixels;

wherein the vehicular vision system, while capturing frames of image data with the at least some of the plurality of cameras, buffers the respective subset of the respective two dimensional array of photosensing pixels of each frame of image data;

wherein the vehicular vision system, using the ECU, generates display frames of image data using each respective buffered subset of the respective two dimensional array of photosensing pixels of the frames of image data; and wherein the video display displays video images derived from the display frames of image data.

12. The vehicular vision system of claim 11, wherein a field of view of each camera of the plurality of cameras partially overlaps the field of view of at least one other camera of the plurality of cameras.

13. The vehicular vision system of claim 11, wherein pixels of each respective two dimensional array of photosensing pixels that are not within the respective subset of the respective two dimensional array of photosensing pixels are not buffered.

14. The vehicular vision system of claim 11, wherein the vehicular vision system determines a pixel of the video display that fails to trace to any pixel of any of the respective two dimensional arrays of photosensing pixels.

15. The vehicular vision system of claim 14, wherein the vehicular vision system, responsive to determining the pixel of the video display that fails to trace to any pixel, interpolates a value for the pixel of the video display based on two or more pixels of one of the respective two dimensional arrays.

16. A vehicular vision system, the vehicular vision system comprising:
 a first camera disposed at a vehicle equipped with the vehicular vision system and viewing exterior of the vehicle, wherein the first camera comprises a first two dimensional array of photosensing pixels, and wherein the first camera captures frames of first image data;
 a second camera disposed at the vehicle and viewing exterior of the vehicle, wherein the second camera comprises a second two dimensional array of photosensing pixels, and wherein the second camera captures frames of second image data, and wherein a field of view of the first camera partially overlaps the field of view of the second camera;
 an electronic control unit (ECU) comprising electronic circuitry and associated software;
 wherein the electronic circuitry of the ECU comprises an image processor for processing frames of first image data captured by the first camera and frames of second image data captured by the second camera;
 a video display disposed in the vehicle and operable to display video images derived from frames of first image data captured by the first camera and frames of second image data captured by the second camera;
 wherein, responsive to a view selection input selecting a view for the video display, the vehicular vision system (i) determines a first subset of the first two dimensional array of photosensing pixels based on tracing rays from pixels of the video display using the selected view to the first two dimensional array of photosensing pixels, and (ii) determines a second subset of the second two dimensional array of photosensing pixels based on tracing rays from pixels of the video display using the selected view to the second two dimensional array of photosensing pixels;
 wherein the vehicular vision system, while capturing first frames of first image data with the first camera, buffers the first subset of the first two dimensional array of photosensing pixels of each first frame of first image data;
 wherein the vehicular vision system, while capturing second frames of second image data with the second camera, buffers the second subset of the second two dimensional array of photosensing pixels of each second frame of second image data;
 wherein the vehicular vision system, using the ECU, generates display frames of image data using the buffered first subset of the first two dimensional array of photosensing pixels of the first frames of first image data and the buffered second subset of the second two dimensional array of photosensing pixels of the second frames of second image data, and wherein at least one pixel of the display frames of image data is derived from a plurality of pixels of the first two dimensional array of photosensing pixels; and
 wherein the video display displays video images derived from the display frames of image data.

17. The vehicular vision system of claim 16, wherein pixels of the first two dimensional array of photosensing pixels that are not within the first subset of the first two dimensional array of photosensing pixels are not buffered.

18. The vehicular vision system of claim 17, wherein pixels of the second two dimensional array of photosensing pixels that are not within the second subset of the second two dimensional array of photosensing pixels are not buffered.

19. The vehicular vision system of claim 16, wherein a single pixel of the video display traces to a plurality of pixels of the first two dimensional array of photosensing pixels.

20. The vehicular vision system of claim 19, wherein a value of the single pixel of the video display is based on a blending of each of the plurality of pixels of the first two dimensional array of photosensing pixels.

* * * * *